INVENTOR.
EDWARD H. YONKERS
BY
Mueller, Dodds + Mason
ATTORNEYS

INVENTOR.
EDWARD H. YONKERS
BY
Mueller, Dodd & Mason
ATTORNEYS

May 16, 1950     E. H. YONKERS     2,508,055
PROTECTIVE APPARATUS
Filed Jan. 16, 1946     5 Sheets-Sheet 3
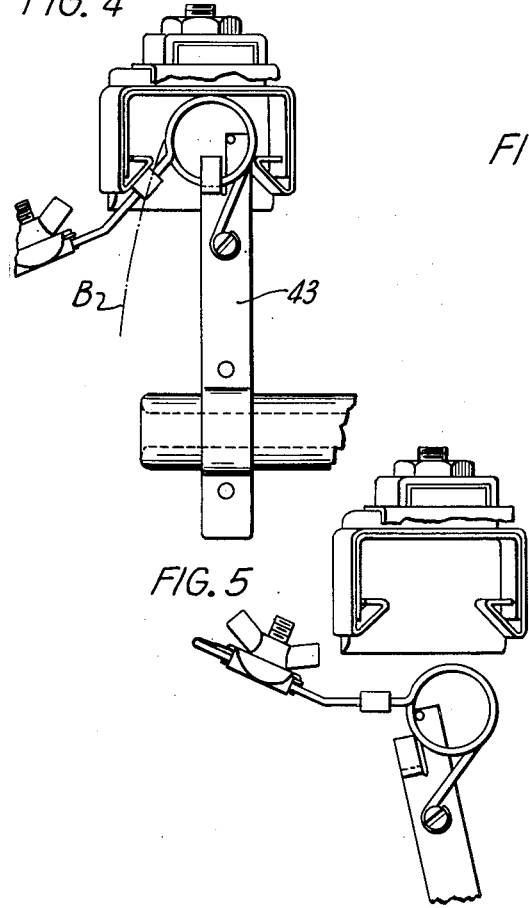
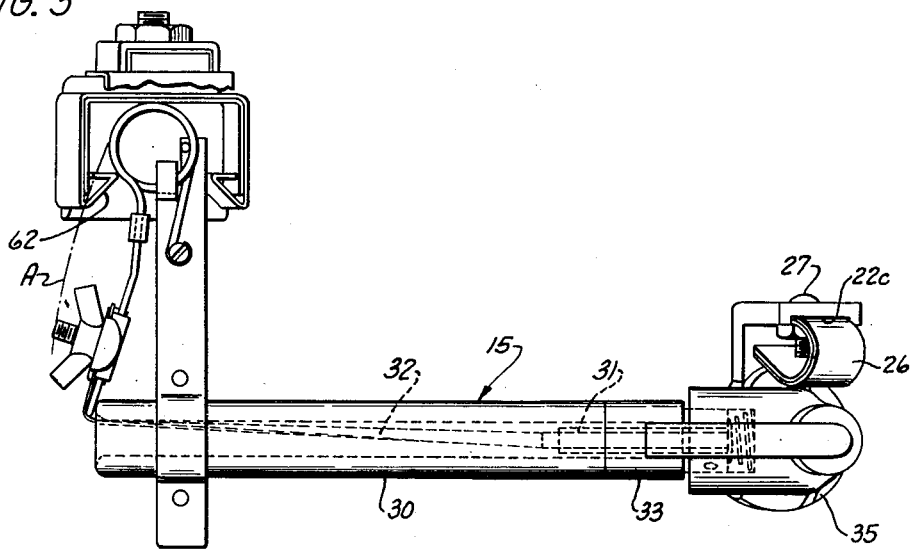
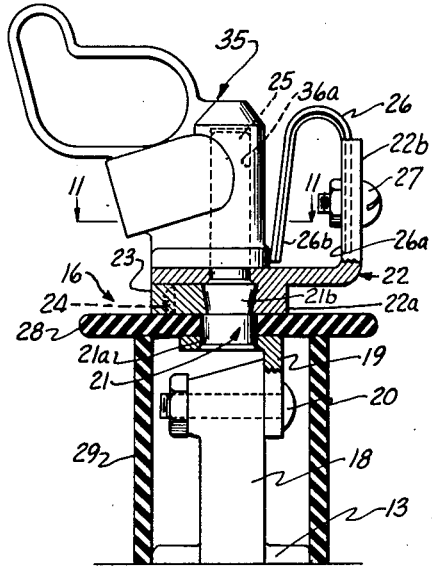
INVENTOR.
EDWARD H. YONKERS
BY
Mueller, Dodds & Mason
ATTORNEYS May 16, 1950 E. H. YONKERS 2,508,055
PROTECTIVE APPARATUS
Filed Jan. 16, 1946 5 Sheets-Sheet 4

INVENTOR.
EDWARD H. YONKERS
BY
Mueller, Dodds + Mason
ATTORNEYS

May 16, 1950  E. H. YONKERS  2,508,055
PROTECTIVE APPARATUS
Filed Jan. 16, 1946  5 Sheets-Sheet 5
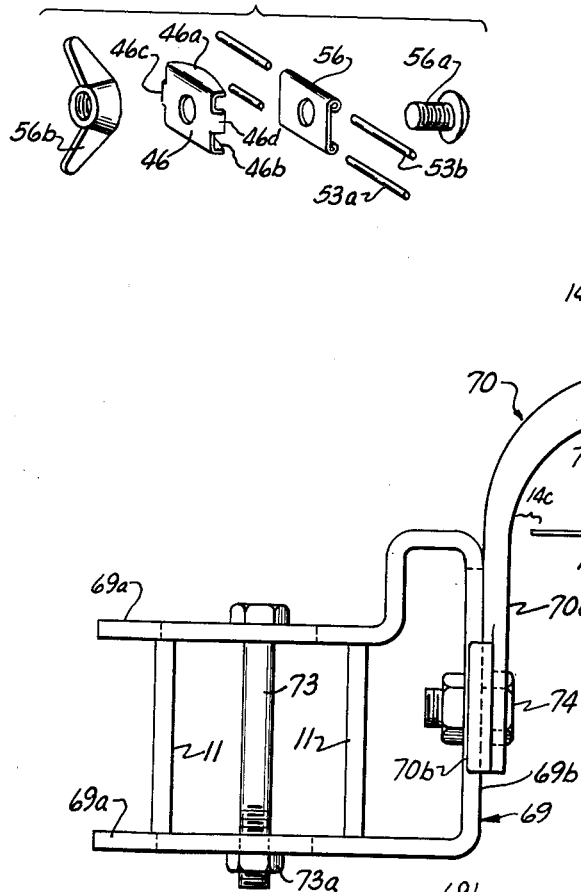
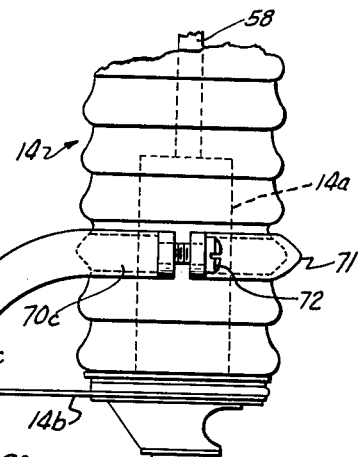
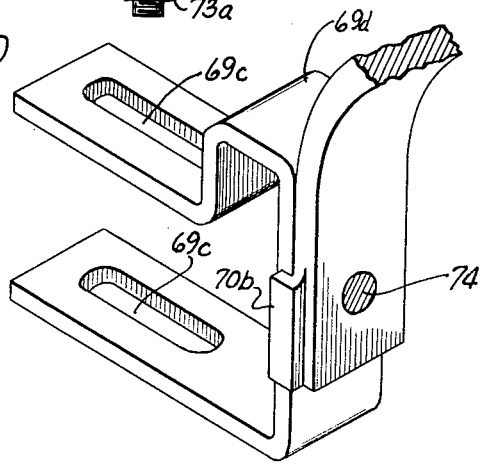
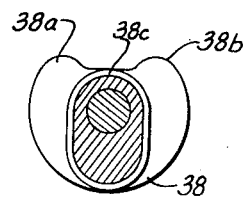
INVENTOR.
EDWARD H. YONKERS
BY
Mueller, Dodd & Mason
ATTORNEYS Patented May 16, 1950

2,508,055

UNITED STATES PATENT OFFICE 2,508,055

PROTECTIVE APPARATUS

Edward H. Yonkers, Chicago, Ill., assignor to Joslyn Manufacturing and Supply Company, Chicago, Ill., a corporation of Illinois Application January 16, 1946, Serial No. 641,605

12 Claims. (Cl. 200—114)

The present invention relates to protective apparatus and more particularly to improvements in apparatus for protecting a pole supported electrical distribution transformer and for disconnecting the transformer from its current supply line when a fault occurs therein.

Apparatus for the purpose described is in certain installations mounted directly upon the housing or tank of the transformer which it is used to protect and conventionally includes entirely independent lightning arrester and fused cutout units for protecting the transformer primary winding against damage occasioned by lightning surges and overload conditions, respectively. In commercial practice few attempts have been made to provide a single unitary device for providing complete transformer protection against dangerous overvoltage and overloads while at the same time providing the usual feature of protecting the line against a short circuit caused by a fault in the transformer. As a result, the cost of providing and maintaining commercially available protective equipment is relatively high. More important, transformer protection is actually not obtained when conventional protective facilities are used. The patent literature contains a few proposals for incorporating both lightning surge and overload protective features in a single device. In none of these proposals, however, are the transformer bushing and tank mounting brackets used to advantage in supporting the transformer protecting unit. The problem of using these facilities for supporting the protective unit is complicated somewhat by the fact that many transformers must be adapted for pole mounting in any one of two or more positions in order to facilitate connection to the transformer secondary terminals, which means in turn that the components of the protective unit must be so constructed as to permit partial support thereof upon any one of two or more tank brackets.

It is an object of the present invention, therefore, to provide improved apparatus of the character described which is so constructed that all of the above-mentioned problems are obviated.

It is another object of the invention to provide for use in a combination arrestor-cutout unit, an improved fused cutout which may be easily and quickly adapted for mounting upon the available supporting facilities of a conventional electrical distribution transformer in either of two different positions.

According to a further and more specific object of the invention, an improved and exceedingly simple subassembly is provided for pivotally supporting a fuse tube upon a transformer bushing stud or the like for swinging movement between open and closed circuit positions, for locking the fuse tube against removal from the stud except when rotated to its full open circuit position and for automatically swinging the tube to its open circuit position incident to fuse rupture within the tube.

In accordance with still another object of the invention, exceedingly simple facilities are embodied in the described sub-assembly for supporting the fuse tube in either of two positions angularly displaced about the longitudinal axis of the fuse tube, thereby to adapt the fuse tube assembly for cooperation with a stationary terminal supported in either of two positions relative to the point of pivotal support of the tube.

It is a further object of the invention to provide in protective apparatus of the character described, improved contact and fuse conductor extracting facilities for normally maintaining an unbroken circuit through the fused current path of the cutout and for effecting fuse conductor extraction and providing a line disconnecting break in the circuit incident to fuse rupture.

In accordance with still another object of the invention, the improved fuse conductor extracting facilities are arranged to assist in swinging the fuse tube to its open circuit setting incident to fuse rupture within the tube, without impairing the speed of fuse conductor extraction.

The invention, both as to its organization and method of operation, together with further objects and advantages thereof, will best be understood by reference to the following specification taken in connection with the accompanying drawings, in which:

Fig. 3 is a top plan view partially in section illustrating further details of the fused cutout forming a part of the protective apparatus illustrated in Figs. 1 and 2;

Figs. 4 and 5 are fragmentary views similar to Fig. 3, but illustrating the parts of the fused cutout in changed positions;

Fig. 6 is a side view partially in section illustrating the subassembly provided for pivotally supporting the fuse tube assembly of the cutout upon the bushing stud of the transformer;

Fig. 9 is a side view illustrating the bracket means provided for adjustably supporting the arrestor insulator of the protective apparatus in any desired position upon either of the two sets of transformer supporting brackets;

Fig. 10 is a fragmentary perspective view illustrating further details of the bracket means shown in Fig. 9;

Fig. 11 is a sectional view taken along the lines 11—11 in Fig. 6; and

Fig. 12 is an explosion view in perspective of the fuse conductor tie assembly forming a part of the fuse extracting mechanism.

Figure 1:
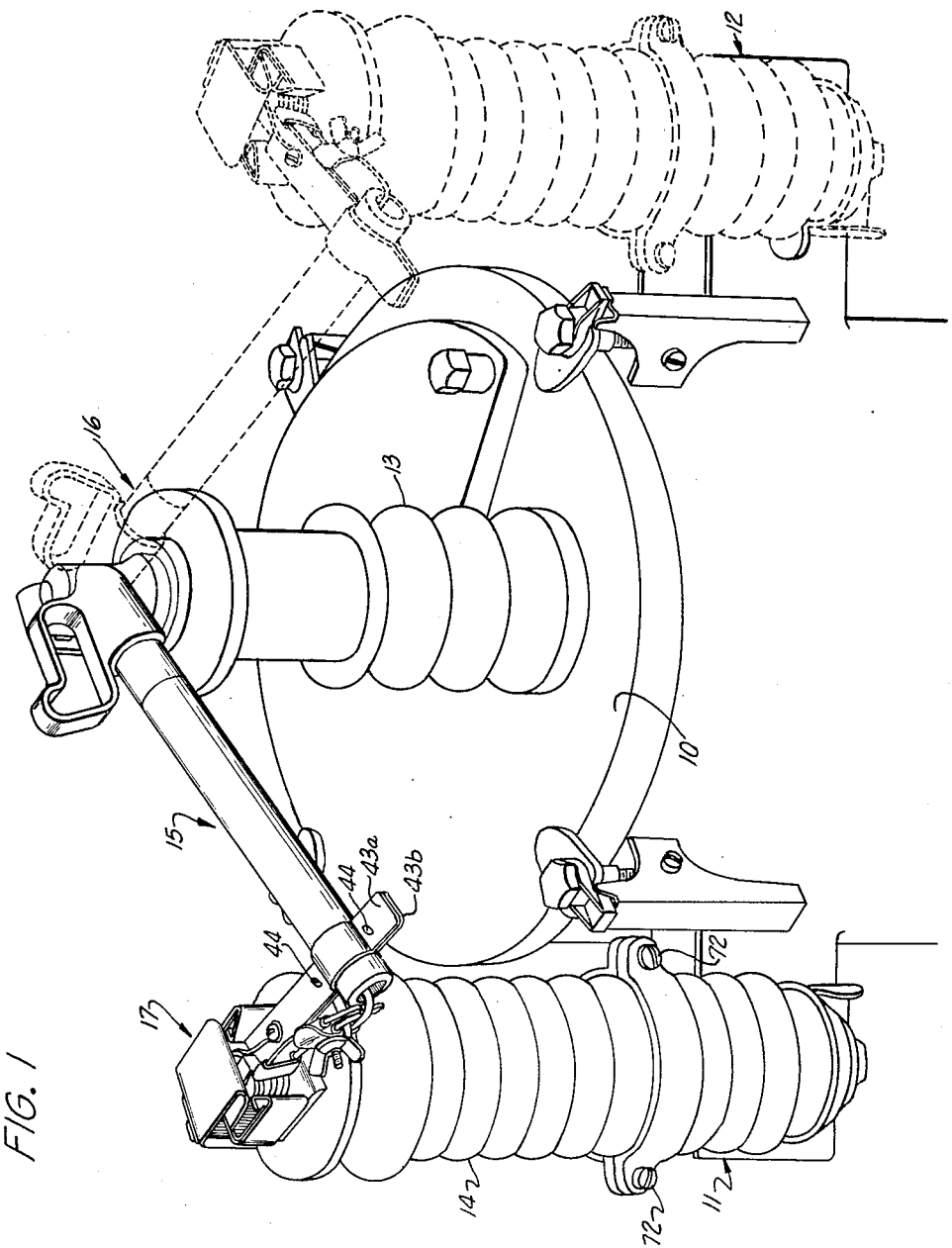
Fig. 1 is a top perspective view of a conventional electrical distribution transformer equipped with the present improved protective apparatus.
Figure 2:
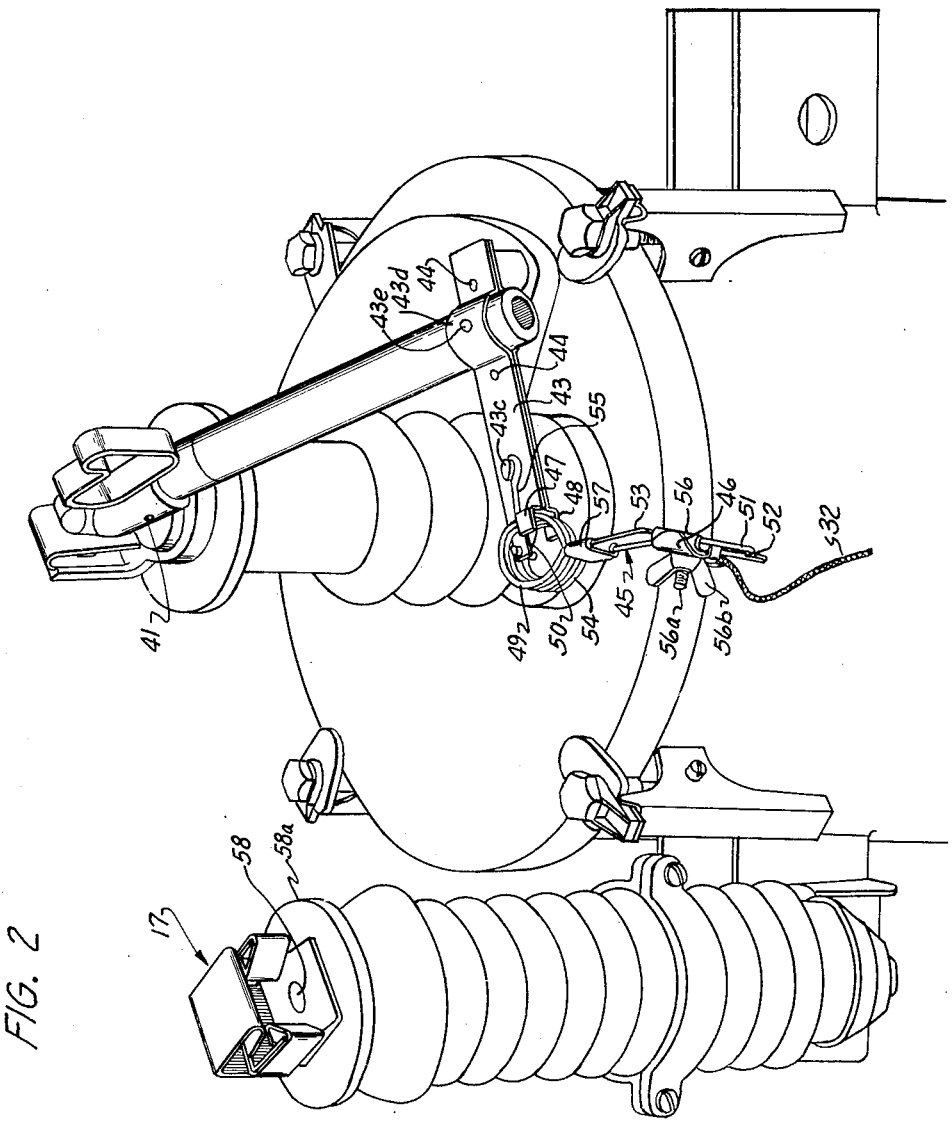
Fig. 2 is a perspective view similar to Fig. 1, but illustrating the parts of the protective apparatus in changed positions.

Referring now to the drawings, and more particularly to Figs. 1 and 2 thereof, the present improved protective apparatus is there illustrated as comprising a combination lightning arrestor and fused cutout unit supported by the existing supporting facilities of a standard electrical distribution transformer 10. Specifically, this transformer comprises two sets of supporting brackets 11 and 12 which are arranged in spaced-apart relationship around the sides of the transformer tank to project radially therefrom, are fixedly mounted upon the transformer tank and are adapted for alternative use in supporting the tank upon a supporting pole or similar supporting structure. The purpose of providing two sets of brackets is to facilitate connection of secondary circuit conductors to the secondary terminals of the transformer (not shown), which are brought out through a terminal block disposed along the hidden side of the transformer tank approximately midway between the brackets. As best shown in Figs. 1, 2 and 6 of the drawings, the transformer is also equipped with the usual bushing insulator 13 which projects upwardly from the top of the transformer tank and serves insulatingly to support the usual terminal stud 18. This stud and the unused set of supporting brackets 11 and 12, are employed to support all parts of the present improved combination arrestor-cutout unit.

In brief, this unit comprises a self-contained lightning arrestor 14a, the parts of which are housed within a petticoated insulator 14, a fuse tube assembly 15, a terminal subassembly 16 for supporting the fuse tube assembly for pivotal swinging movement about the long axis of the stud 18 and a stationary terminal assembly 17 with which the contract provided at the swing end of the fuse tube assembly 15 is latchingly engageable. More specifically, the electrode structure of the lightning arrestor 14a shown in dash lines in Fig. 9 of the drawings is housed within a cavity extending upward from the lower end of the insulator 14. Preferably, this arrestor is of the improved expulsion type disclosed and claimed in Patent No. 2,164,720 granted July 4, 1939, to Ralph R. Pittman. Among other elements it comprises a pair of spaced electrodes, one of which is connected to a conductive rod 58 extending through the insulator 14 to the upper end thereof to support the terminal assembly 17, and the other of which is connected to a gap electrode 14b.

For the purpose of adjustably supporting the insulator 14 and associated parts in a desired vertical and horizontal position upon either of the two sets of radially extending brackets 11 and 12, two cooperating brackets 69 and 70 are provided. Specifically, the bracket 69 is of substantially U-shaped configuration, having legs 69a which are adapted clampingly to embrace the edges of the supporting bracket 11, for example, and are slotted as indicated at 69c to receive a clamping bolt 73. With this construction, the bracket 69 may be supported upon the supporting brackets 11 in a variety of laterally displaced positions by sliding the legs 69a thereof along the brackets 11 and sliding the bolt 73 along the slots 69c to occupy a position mid-way between the brackets 11. Further, by setting up the nut 73a on the bolt 73, the bracket 69 may be fixedly mounted upon the brackets 11 in any position to which it is adjusted. The second bracket 70 is of L-shaped configuration, being provided with a half-collar end 73 cooperable with a clamping half-collar 71 and clamping screws 72 to embrace and rigidly support the insulator 14 about one of its petticoat corrugations. The vertical leg of the bracket 70 is equipped with side flanges 70b along opposite edges thereof to provide a channel within which the vertical base leg 69b of the bracket 69 may be received. This leg of the bracket 69 is suitably slotted along its length to receive a clamping bolt 74, thereby to provide for vertical adjustment of the bracket 70 and the insulator 14 relative to the top of the tank 10. To extend this range of vertical adjustment, the upper leg 69a is provided with an upwardly extending U-shaped portion 69d. With this structure, the bracket 70 may within limits be adjusted to any desired vertical position and rigidly clamped in the selected position. Further, the flanges 70b, in engaging the edges of the bracket leg 69b, positively prevent rotation of the bracket 70 about the bolt 74. To provide an isolating gap in series with the gap of the arrestor 14a between the conductive rod 58 and the transformer tank, i. e. ground, the gap electrode 14b is positioned in spaced relationship to the bracket 70. An isolating gap 14c, appropriately designed as to length to prevent system current leakage, is thus provided in the protective path between the terminal assembly 17 and the grounded transformer tank.

As indicated above, the terminal subassembly 16 is provided to act as a pivotal support for the fuse tube assembly 15. Briefly, and as best shown in Fig. 6 of the drawings this subassembly comprises a conductive L-bracket 19 fixedly mounted by means of a bolt 20 upon the upper end of the stud 18, and in turn fixedly mounting a supporting stud 21 which is employed adjustably to support the fuse tube assembly pivot stud 25 and its supporting base 22. More specifically, the stud 21 includes a base portion 21a extending through and fixedly connected to the horizontal leg of the bracket 19, and a neck portion 21b tapering upwardly from its lower end to its upper end which acts as a pivotal support for the base 22 and pivot stud 25. The stud 25 is fixedly mounted upon the base 22 to project upwardly therefrom, and along the bottom of this base there is provided a half-collar portion 22a having a half-circular clamping surface suitably inclined to the vertical to mate with the flared neck 21b of the stud 21. A half-collar clamping ring 23 also having an inclined half-circular clamping surface cooperable with the flared neck 21b of the stud 21 is employed in conjunction with assembly bolts 24 passing through the parts 23 and 22a upon opposite sides of the stud 21 to clamp the base 22 to the stud 21 in any desired angular setting about the longitudinal axis of the studs 21 and 25. Protection against birds faulting the bushing stud 18 to the transformer tank is obtained by enclosing the stud 18 with a cylindrical insulating member 29, the lower edge of which rests upon the top of the insulator 13 and the upper edge of which supports an insulating disc 28. This disc is centrally apertured to receive the stud 21 and engages the base 22 at the upper side thereof. Preferably, the parts 28 and 29 are formed from a suitable molded insulating material such, for example, as "Bakelite."

For the purpose of swinging the fuse tube assembly 15 to its open circuit setting incident to fuse rupture and the additional purpose of locking this assembly against detachment from the pivot stud 25 so long as it occupies any setting other than its open circuit setting, a combination biasing and locking spring 26 is provided. This spring is preferably of multi-ply construction, is of U-shaped configuration and comprises two legs 26a and 26b. The leg 26a is fixedly mounted upon an L-bracket 22b formed integral with the base 22 and extending laterally therefrom. The vertical part of this bracket is recessed as indicated at 22c to provide side flanges embracing the edges of the spring leg 26a, and a bolt 27 is employed fixedly to clamp this spring leg to the bracket.

Figure 7:
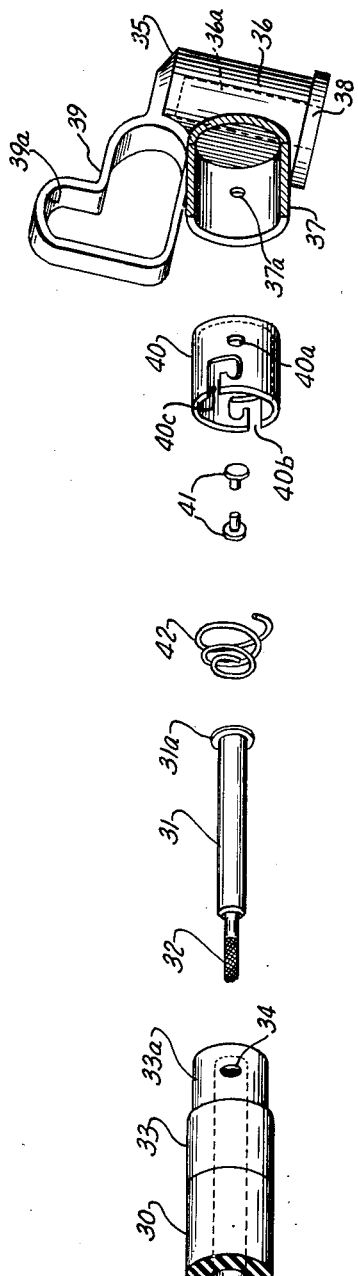
Fig. 7 is an explosion view in perspective illustrating the details of the facilities provided for rotatably supporting the fuse tube in either of two positions upon the supporting subassembly illustrated in Fig. 6.

As best shown in Figs. 1, 2 and 3 of the drawings, the fuse tube assembly 15 comprises a fuse tube 30, a pivot element 35 adapted for detachable pivotal support by the pivot stud 25, a supporting arm 43 and fuse conductor extracting means in the form of a resilient wire member 45 pivotally carried by the arm 43 at the extended end of this arm and provided with combination biasing and contact parts 54 latchingly engageable with the contact elements of the terminal assembly 17. More particularly, and as best illustrated in Fig. 7 of the drawings, the pivot element 35 comprises a tubular part 36 having a central bore 36a for receiving the pivot stud 25, a fuse tube supporting socket 37, a camming part 38 disposed along the base of the supporting part 36, and a loop 39 adapted to receive the hook end of a switch stick to provide for switch stick manipulation of the fuse tube assembly. The loop 39 of this element extends outwardly and overhangs the fuse tube socket 37 in order that the assembly 15 may be properly balanced at the end of a switch stick when suspended from the hook part thereof. Specifically, the switch stick hook is adapted to be received within an upwardly extending portion 39a of the loop 39 and to be interlocked with this portion of the loop during manipulation of the assembly. As best shown in Figs. 3 and 11 of the drawings, the camming part 38 of the pivot element 35 extends radially outward from the pivot axis of this element and is provided with an edge cam surface radially displaced from the axis of rotation of the element. This surface includes two different portions 38a and 38b uniformly radiated in each direction from a low point 38c located nearest the axis of rotation of the pivot element 35. These two camming surface portions 38a and 38b are selectively engageable with the free leg 26b of the spring 26 to bias the fuse tube 30 for swinging movement away from the terminal assembly 17 incident to fuse rupture regardless of the relative positions occupied by the terminal assemblies 16 and 17, i. e. regardless of the one of the two sets of brackets 11 and 12 upon which the insulator 14 is mounted. In mounting the assembly 15 upon the pivot stud 25, the low point 38c of the camming part 38 is movable downward past the leg 26b of the spring 26 without interference. When, however, the element 35 is seated upon the pivot stud 25 and the assembly 15 is rotated toward its closed circuit position, one or the other of the two cam portions 38a and 38b stresses the free end of the spring leg 26b toward the other spring leg 26a. In so doing, the cam part 38 is moved beneath the main portion of the spring leg 26b in the manner illustrated in Fig. 3 of the drawings, thereby to provide a lock between the pivot element 35 and the supporting base 22 which prevents removal of the assembly 15 from the stud 25.

For the purpose of positioning the contact parts 54 of the fuse extracting member 45 for latching engagement with the contact elements of the terminal assembly 17, regardless of the position of this assembly relative to the terminal assembly 16, i. e. regardless of whether the insulator 14 is mounted upon the brackets 11 or the brackets 12, facilities are provided for mounting the pivot end of the fuse tube 30 upon the pivot element 35 in either of two positions angularly displaced about the longitudinal axis of the fuse tube. As best shown in Fig. 7 of the drawings, these facilities comprise a conductive ferrule 33 fixedly mounted upon the pivot end of the fuse tube 30 and receivable within a socket 40 disposed within the socket 37 of the pivot element 35. Specifically, the socket 40 is anchored within the socket 37 of the pivot element by means of rivets 41. Along the bottom wall thereof the socket 40 fixedly mounts biasing means in the form of a coil spring 42, and along its sides is provided with diametrically opposed slots 40b and 40c for receiving lugs or trunnions 34 which extend radially outward from the ferrule 33 at diametrically opposed points around the reduced diameter neck portion 33a of the ferrule.

With the described construction, the fuse tube 30 may be easily and quickly detached from the pivot element 35 to permit fusing thereof with a fuse link 31 having a head 31a which bears against the end of the ferrule 33 and a fuse conductor 32 which projects out through the open swing end of the fuse tube. In order to provide full protection for the transformer under any and all overload conditions imposed thereon, as well as protection against shortcircuiting the line feeding the transformer should a fault develop in the transformer, fuse links of the improved form disclosed and claimed in applicant's Patent No. 2,453,688, dated Nov. 9, 1948, are preferably used in fusing the cutout. After a fuse link is thus positioned in the bore of the ferrule 33, this ferrule may be positioned to bring the lugs 34 in registry with the slot openings 40b and 40c, following which the neck portion 33a of the ferrule may be pushed into the socket 40. As the ferrule end is thus inserted in the socket 40, the lugs 34 are brought into registry with the lateral parts of the slots 40b and 40c to permit slight rotation of the fuse tube relative to the socket, and thus position the lugs 34 for retention in the slot seats provided at the ends of the lateral slot parts. With the ferrule neck 33a thus properly positioned within the socket 40, the biasing spring 42 serves the dual function of forcing the fuse link head 31a into engagement with the end of the ferrule to maintain good electrical contact therebetween and of forcing the lugs 34 into engagement with the retaining seats of the slots 40b and 40c. Since the lugs 34 are adapted to register with the slots 40b and 40c in either of two positions of the fuse tube 30 displaced 180° about the longitudinal axis of the tube, it will be understood that the tube may be mounted upon the pivot element 35 either in the full line position or the dash line position shown in Fig. 1 of the drawings, thereby to position the contact parts 54 of the extracting member 45 for engagement with the terminal assembly 17 regardless of which of the particular set of supporting brackets 11 or 12 the insulator 14 may be supported upon.

Referring now more particularly to the construction of the combination fuse conductor extracting and contact means provided at the swing end of the fuse tube 30, it is pointed out first that the supporting arm 43 is comprised of two strips 43a and 43b of bronze stock clamped together by means of rivets 44 disposed along the length thereof and separated and formed at 43d clampingly to embrace the fuse tube 30 at a point adjacent the swing end of the tube. The fuse extracting member 45 is of one piece construction, preferably being formed from heavy gauge resilient wire stock. It is comprised of supporting parts 55 disposed upon opposite sides of the supporting arm 43 and provided with eyelet ends which pivotally embrace a short pivot shaft extending through the arm 43 at a point intermediate the ends of this arm. The extracting member 45 further comprises contacting and biasing parts 54 in the form of two sets of spring convolutions 54a and 54b, and a swingable arm part 53 having parallel portions 53a and 53b. This arm part is provided at its swing end 51 with a notch 52 adapted to seat the fuse conductor 32 extending from a fuse link 31 located within the fuse tube.

In order to fixedly anchor the extended end of the fuse conductor 32 to the arm part 53, a clamping assembly is provided which comprises a plate 56 having its ends wrapped around and clamped to the spaced arm portions 53a and 53b, a stud bolt 56a extending through the plate 56 between the two identified arm portions and fixedly anchored to the plate, a wing nut 56b and a clamping plate 46 adapted to be moved toward the plate 56 to clamp the fuse conductor against the plate 56b by threading the nut 56b along the bolt 56a. As best shown in Fig. 12 of the drawings, the clamping plate 46 is provided with overhanging ears 46a and 46b adapted to project downwardly over the ends of the plate 56 to retain the fuse conductor therebetween. The clamping plate is also provided with end ears 46c and 46d displaced longitudinally of the arm part 53 and adapted to project downwardly over the sides of the plate 56. With this novel construction, the four ears 46a, 46b, 46c and 46d serve to prevent relative rotation between the plates 46 and 56 during a fuse conductor clamping operation, and the ear 46c farthest removed from the swing end 51 of the arm part 53 acts as a post around which the fuse conductor may be looped to provide an effective anchor point for the conductor which prevents slippage of the conductor between the two plates 46 and 56.

As indicated above, the convolutions 54a and 54b are employed for the dual purpose of biasing the arm part 53 for swinging movement away from the swing end of the fuse tube upon fuse rupture and of engaging the contact elements of the terminal assembly 17 to complete the electrical circuit between this assembly and the stud 18. In order to limit pivotal movement of the supporting parts 55 about the stud 43a as the arm part 53 is moved toward the swing end of the tube 30, thereby to energize the spring convolutions 54a and 54b, the strips 43a and 43b forming the supporting arm 43 are respectively provided with oppositely disposed L-shaped lugs 47 and 48 formed integral therewith and having horizontal legs overhanging the spring convolutions. To prevent overthrow of the extracting arm 53 during fuse extracting movement thereof, stop means comprising a stud 59 mounted upon projecting portions 50 of the supporting arm parts 43a and 43b within the coil convolutions 54a and 54b are provided. This stud is adapted to be engaged by the spring convolutions 54 at the inner sides thereof to provide the desired limit on reverse rotation of the arm 53 during its fuse extracting movement.

As explained below, during extracting movement of the arm 53, the portion thereof nearest the spring convolutions 54 engages the contact shoulder 62, for example, to pivot the member 45 about the stud 43c and assist in effecting disengagement of the convolutions and contact shoulder. Direct engagement between the described arm portion and the shoulder 62 is prevented by providing a wear plate 57 adjacent the convolutions 54 having its ends clampingly embracing the arm portions 53a and 53b.

Figure 8:
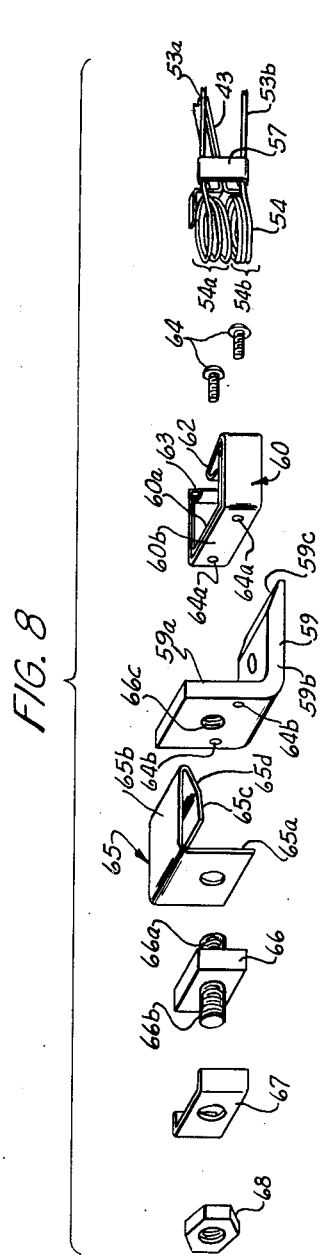
Fig. 8 is an explosion view illustrating in perspective the cooperative parts of the stationary terminal assembly with which the swing end contact of the fuse tube assembly is engageable, and the contact part of the fuse extracting member which is engageable with this terminal assembly and is embodied in the fuse tube assembly.

As best shown in Fig. 8 of the drawings, the stationary terminal assembly 17 comprises a conductive L member 59 having a base leg 59b rigidly mounted upon the projecting end of the conductor 58 and partially supported by an insulating disc 59a resting upon the top of the insulator 14. The vertical leg 59a of the L member 59 is employed to support the remaining components of the terminal assembly. These components comprise a main contact element 60 of U-shaped construction having inner and outer lamination 60a and 60b. At the respective leg ends thereof, the outer spring leg thereof is provided with inwardly directed angularly extending shoulder portions 62 and 63, adapted for alternative use in contacting the spring convolutions 54 at the outer circumference thereof depending upon which of the two sets of supporting brackets 11 and 12 is employed to support the insulator 14. The described contact element 60 is adapted to be fixedly mounted upon the vertical leg 59a of the L member 59 by means of assembly screws 64 passing through openings 64a in the contact parts 60a and 60b and threaded into openings 64b in the leg 59a of the member 59. The terminal assembly 17 further comprises a secondary contact element 65 of generally L-shaped configuration, having a vertical leg 65a adapted to be clamped against the back side of the leg 59a, and also provided with a horizontally extending leg 65b terminating in an inturned portion 65c which overhangs the contact element 60. The assembly 17 also includes a combination clamping and terminal sub-assembly comprising a clamping plate 66 having oppositely extending threaded portions 66a and 66b, the first of which is adapted to be threaded into an opening 66c through the upstanding leg 59a of the member 59, thereby to clamp the vertical leg 65a of the contact element 65 against the leg 59a. The oppositely extending threaded portion 66b of the member 66, together with a clamping element 67 and a nut 68, are employed in making line wire connections to the contact assembly.

As will be evident from the above explanation, one of the two shoulders 62 and 63 of the contact element 60 is cooperable with the spring convolutions 54 to provide self-biased engagement therebetween along a substantially vertical line. The contact element 65, on the other hand, is cooperable with the base leg 59b to provide electrically conductive contacting surfaces between the spring convolutions and the assembly 17 in substantially horizontal planes. More specifically, the base leg 59b and the contact element 65 are provided with outwardly flaring camming surfaces 59c and 65d, having the function of squeezing the spring convolutions 54 together as these convolutions are moved into engagement with the contacting parts of the assembly 17. Thus, spring pressed contacting surfaces are provided between the contact elements of the assembly 17 and the member 45 in planes displaced from each other by 90°. As a result, vibration which may be imparted to the parts of the transformer 60 cannot produce chattering engagement of the convolutions 54 with the parts of the contact assembly 17.

From the above explanation it will be apparent that with the fuse tube assembly 15 detached from the stationary terminal assemblies 16 and 17, the member 45 is, within the limits permitted by the lugs 47 and 48 and the stop stud 49, freely rotatable relative to the supporting arm 43. When it is desired to fuse the assembly 15, the fuse tube 30 and associated ferrule 33 are detached from the socket 40 and a fuse link 31 inserted within the chamber of the tube 30 and ferrule 33 so that the pigtail conductor 32 thereof projects out of the open swing end of the tube. The neck portion 33a of the ferrule 33 may now be reinserted into the socket 40 to bring the lugs 34 into seating engagement with the seats provided at the bottoms of the slots 40b and 40c. At this point, it will be understood that the angular position of the tube 30 relative to the socket 40 and pivot element 35 is determined by the direction in which the supporting and extracting arms 43 and 53 must project laterally in order that the spring convolutions 54 may be engageable with the stationary contact assembly 17. This, in turn, is determined by the particular set of supporting brackets 11 or 12 upon which the insulator 14 is mounted. After the pivot element 35 has thus been appropriately mounted upon the ferrule 33 to establish the desired angular relationship between the pivot bore 36a and the arms 43 and 53, the extracting arm 43 is pivoted to bring the swing end 51 thereof into engagement with the swing end of the tube 30. During such initial movement of the arm 53 toward the arm 43, the supporting parts 55 engage the stop lugs 47 such that the spring convolutions 54 are energized as the end 51 of the arm 53 is moved approximately from the position shown in Fig. 2 of the drawings into engagement with the swing end of the tube 30. The pigtail conductor 32 is now seated in the notch 52 at the end of the arm 45, passed beneath one of the ears 46a and 46b of the clamping plate 46, wrapped around the ear 46c and passed beneath the remaining ear 46a or 46b to extend back toward the end 51 of the arm 53. After drawing the conductor taut around the ear 46c, the wing nut 56b is tightened to clamp the conductor 32 between the two plates 46 and 56. Thus, the pigtail conductor 32 is tensioned and the spring convolutions 54 are fully energized to effect extraction of the conductor 32 incident to rupture of the link 31.

In order to mount the fuse tube assembly 15 upon the terminal assembly 16, the hook of a switch stick is first inserted through the loop 39 to bring the shank portion of the hook into registry with the loop portion 39a of reduced diameter. Interlocking of the hook shank with the sides of the small diameter opening 39a serve to prevent inadvertent removal of the assembly 15 from the end of the switch stick. To engage the pivot element 35 with the contact terminal stud 25, the assembly 15 is positioned to bring the low point 38c of the camming part 38 opposite the leg 26b of the biasing spring 26 and to position the pivot bore 36a over the stud 25. The assembly may now be lowered to engage the pivot element bore 36a with the stud 25.

After the assembly 15 is thus pivotally mounted upon the stud 25, the hook of the switch stick may be withdrawn from the loop 39 and engaged with the arm 43 and the tube 30 to rotate the assembly 15 into its closed circuit position. Assuming that the insulator 14 is mounted upon the brackets 11, the fuse tube assembly 15 is rotated in a clockwise direction from the position illustrated in Fig. 2 of the drawings to bring the coil convolutions 54 into engagement with the contact elements of the contact assembly 17. After the convolutions 54 engage the tapered camming surfaces 59c and 65d, they are squeezed together as they move into the contact assembly. Further, after the convolutions engage the camming surface of the contact shoulder 62, the convolutions are pushed to the right from the position shown in Fig. 3 of the drawings to effect slight clockwise pivotal movement of the supporting parts 55 about the pivot shaft 43c. Concurrently therewith the leg of the contact element 60 terminating in the shoulder 62 is deformed outwardly. In short, the deformation of the arm 53 and the contact element 60 resulting from engagement of the spring convolutions 54 with the camming surface of the shoulder 62, permits the convolutions to pass over this shoulder as the assembly 15 moves into its closed circuit position. After the high points of the convolutions 54 pass beyond the high point of the shoulder 62 during the final pivotal movement of the assembly 15, the deformation of the parts 60 and 55 is partially relieved until finally the high point of the shoulder 62 bears against the convolutions 54 approximately at the points where these convolutions merge into the arm portions 53a and 53b. Engagement of the convolutions with the base of the contact element 60 prevents the convolutions from moving further into the assembly 17. Thus a large overhang is provided between the shoulder 62 and the convolutions 54 which positively latches these elements in engagement.

As the assembly 15 is pivoted into its closed circuit setting in the manner just explained the camming surface 38a of the pivot element camming part 38 rides against the free end of the spring 26b to flex this spring end toward the lug 26a of the spring. Thus the parts 26 and 38 coact to bias the assembly 15 for movement of the assembly 15 to its open circuit position in response to disengagement of the coil convolutions 54 from the contact assembly 17. Further, as the camming surface 38a forces the end of the spring leg 26b away from the axis of rotation of the pivot element 35, the camming part 38 is positioned beneath the upper portion of the spring 26 to provide an interlock which positively prevents inadvertent removal of the assembly 15 from the pivot stud 25.

After the fuse tube assembly has thus been operated to its closed circuit position, a fused current path is provided between the terminal assembly 17 and the transformer bushing stud 18, this path including the elements 60, 59 and 65 of the terminal assembly, the extracting member 45, the conductor 32, the fusible element of the link 31 and the metal housing of the link, the engaged parts 33 and 40, the pivot element 35 and the parts 25, 22, 21 and 19. In this regard it will be noted that engagement of the spring leg 26b with the cam surface 38a provides pressurized contact surfaces electrically connecting the two elements 35 and 22. In using the described protective apparatus, the line wire connection is made at the terminal assembly 17 by means of the conductor clamping facilities 67, 68 provided for this purpose. A lightning surge protective path in parallel with the described fused path and the transformer primary winding is provided between the terminal assembly 17 and the grounded transformer tank. This path includes the conductive rod 58, the spaced electrodes of the arrestor unit 14a and the parts 14b and 70 forming the isolating gap 14c. The manner in which this protective path is rendered conductive when a lightning surge, for example, appears between the terminal assembly 17 and ground, will be readily apparent to those skilled in the art.

So long as current flow over the described conductive path between the terminal assembly 17 and the transformer stud 18 does not exceed the current-time fusing characteristic of the link 31, the fusible element within this link serves mechanically to hold the extracting arm 53 in its set position wherein the end 51 thereof is closely adjacent the open end of the fuse tube 30. When, however, this fusible element is required to carry current in excess of a predetermined magnitude for more than a predetermined time interval, it is ruptured to relieve the holding force imposed upon the extracting arm 53 through the conductor 32. The energized coil convolutions 54 now operate rapidly to rotate the arm 53 away from the supporting arm 43, thereby to withdraw the fuse pigtail conductor 32 from the open end of the fuse tube 30. In this regard it is noted that the arm 45 is of substantial length such that rotation thereof through a relatively small angle produces a large displacement between the swing end 51 thereof and the open end of the tube 30. Further, this arm is of small mass and hence has little inertia, thus insuring rapid acceleration of the swing end 51 thereof away from the open end of the fuse tube 30. Moreover, the length of the extracting arm 53 and the permissible angle of movement of the arm is such that under any and all conditions of fuse rupture all of the pigtail conductor 32 and the unfused segment of the fuse link attached to this conductor are completely removed at high speed from the bore of the fuse tube 30 to hang downwardly over the side of the transformer tank.

As the arm 45 is rotated from the position illustrated in Fig. 3 to the position illustrated in Fig. 4, the wear plate 57 comes into engagement with the shoulder 62 and reacts against this shoulder to pivot the arm supporting parts 55 about the pivot shaft 43c to the position shown in Fig. 4 of the drawings. As a result, the coil convolutions are moved to the right within the contact assembly 17 to displace the same out of overhanging or latching relationship with the shoulder 62, i. e. to the position shown in Fig. 4 of the drawings. In other words, and again referring to Figs. 3 and 4 of the drawings, the path which the left sides of the convolutions 54 must follow in moving to the open circuit position is shifted from the arc A to the arc B each having the axis of rotation of the assembly 15 as its center. It will be noted that the latter line clears the high point of the shoulder 62, which means that the convolutions 54 may be disengaged from the contact assembly 17 without interference by the contact shoulder 62.

Engagement of the wear plate 57 with the camming surface of the shoulder 62 also has the effect of producing a component of force acting along the arm 43 tending to move the spring convolutions 54 away from the contact assembly 17. This force component is assisted by the spring 26 coacting with the camming surface 38a. In combination, the two force components pivot the fuse tube assembly 15 about the terminal stud 25 to effect the desired disengagement of the spring convolutions 54 from the terminal assembly 17. Following such disengagement, the assembly 15 is swung to its open circuit position about the pivot terminal stud 25 under the influence of the spring 26 reacting against the camming surface 38a. It will be understood that the open circuit position of the assembly is reached when the end of the spring 26b is brought to bear against the low point 33c of the cam part 38.

After the convolutions 54 are disengaged from the terminal assembly 17, the arm 53 rapidly continues its pivotal movement away from the supporting arm 43 and arm supporting parts 55 continue their pivotal movement in a clockwise direction about the pivot stud 43c. Pivotal movement of the latter parts is arrested when the stop stud 49 is engaged by the convolutions 54 at the inner sides thereof. The final open circuit position of the member 45 is reached when the parts thereof are moved to the positions shown in Fig. 5 of the drawings.

From the preceding explanation it will be understood that since the described engagement of the plate 57 with the contact shoulder 62 serves primarily to shift the position of the coil convolutions within the terminal assembly 17 by pivoting the entire member 45 about the stud 43c, and further, since the plate 57 is located relatively close to the center of the convolutions 54, the rapid swinging movement of the arm to extract the conductor 32 is not substantially impeded or slowed down through engagement of the plate 57 with the shoulder 62. Further, the impacting engagement of the plate 57 with the shoulder 62 has the effect of breaking any ice coatings which may have formed on the coil convolutions 54 and the parts of the terminal assembly 17. Moreover, and due to the lever long arm through which the extracting arm 53, in reacting against the contact shoulder 62, exerts a pivoting force upon the entire fuse tube assembly tending to rotate the same about the terminal stud 25, ice coatings which may have formed upon the pivot element 35 and the parts of the assembly 16 are readily broken. Thus, the described arrangement is such that a secondary break in the fused conductive path normally extending through the terminal assembly 17 and the terminal stud 18 is insured, even under severe operating conditions.

In order to provide for a disconnecting break in the transformer primary circuit of substantial magnitude when the insulator 14 is supported by the brackets 11, the base plate 22 of the assembly 16 is normally adjusted about the axis of rotation of the pivot element 35, i. e. the neck 21b of the stud 21, to the approximate position shown in Fig. 2 of the drawings. In adapting the apparatus for support of the insulator from the brackets 12 in the manner shown in dash lines in Fig. 1 of the drawings, the insulator 14 is pivoted within the clamping half-collars 70c and 71 to a position wherein the contact shoulder 63 of the contact element 60 is adapted to perform the latching and contacting functions described above, rather than the contact shoulder 62. Further, the fuse tube 30 and the parts carried thereby, are rotated through an angle of 180° relative to the pivot element 35 about the longitudinal axis of the fuse tube in a manner clearly apparent from the above explanation. A further adjustment which is required, is that of pivoting the base 22 through an angle of approximately 90° in a clockwise direction from the position shown in Fig. 2 of the drawings in order to position the spring leg 21b for engagement with the camming surface 38b of the pivot element camming part 38. This may conveniently be done by loosening the screws 24 to relieve the clamping force exerted by the half-collar 23b against the flared neck 21b of the stud 21, and then re-tightening these screws after the base 22 is pivoted to the desired angular position.

After the described changes are made, the apparatus is arranged to operate in substantially the exact manner explained above, with the exception that during open circuit movement of the assembly 15 in response to fuse rupture, the assembly is pivoted in a clockwise direction, rather than a counter-clockwise direction, due to the reaction between the extracting arm 53 and the contact shoulder 63 accompanied by the action of the spring 26 in reacting against the camming surface 38b. Regardless of which set of brackets 11 and 12 is employed to support the insulator 14, suitable lateral and vertical adjustments in the position of the insulator will be required in order accurately to position the contact assembly 17 relative to the path of movement of the spring convolutions 54. This may easily be accomplished in an obvious manner by adjustment of the bracket 69 relative to the brackets 11 or 12 in use and by vertically adjusting the bracket 70 along the base leg 69b of the bracket 69.

While there has been described what is at present considered to be the preferred embodiment of the invention, it will be understood that various modifications may be made therein which are within the true spirit and scope of the invention as defined in the appended claims.

I claim:

1. Electrical protective apparatus, comprising a pair of spaced terminals insulated from each other and adapted to be supported in either of two different relative positions, an expulsion fuse tube assembly comprising a fuse tube having a pivot end and provided with a swing end contact latchingly engageable with one of said terminals, and means for pivotally supporting said fuse tube at the pivot end thereof upon the other of said terminals in either of two positions angularly displaced about the longitudinal axis of said fuse tube, whereby said contact may be positioned for latching engagement with said one terminal regardless of the relative positions of said terminals.

2. Electrical protective apparatus, comprising a pair of spaced terminals insulated from each other and adapted to be supported in either of two different relative positions, an expulsion fuse tube assembly comprising a fuse tube having a pivot end and provided with a swing end contact latchingly engageable with one of said terminals, means for pivotally supporting said fuse tube at the pivot end thereof upon the other of said terminals in either of two positions angularly displaced about the longitudinal axis of said fuse tube, whereby said contact may be positioned for latching engagement with said one terminal regardless of the relative positions of said terminals, fuse controlled means for effecting disengagement of said contact and one terminal in response to fuse rupture within said tube, and biasing means for pivoting said tube about its pivot end in either of two directions, thereby to provide for swinging movement of said contact away from said one terminal regardless of the relative positions of said terminals.

3. Electrical protective apparatus, comprising first and second terminals insulated from each other, means for mounting said first terminal in either of two positions relative to said second terminal, a fuse tube assembly comprising a fuse tube having a pivot end and provided with a swing end contact latchingly engageable with said first terminal, and means for pivotally supporting said fuse tube at the pivot end thereof upon said second terminal in either of two positions angularly displaced about the longitudinal axis of said fuse tube, whereby said contact may be positioned for latching engagement with said first terminal regardless of the position of said first terminal relative to said second terminal.

4. Electrical protective apparatus, comprising first and second terminals insulated from each other, means for mounting said first terminal in either of two positions relative to said second terminal, a fuse tube assembly comprising a fuse tube having a pivot end and provided with a swing end contact latchingly engageable with said first terminal, means for pivotally supporting said fuse tube at the pivot end thereof upon said second terminal in either of two positions angularly displaced about the longitudinal axis of said fuse tube, whereby said contact may be positioned for latching engagement with said first terminal regardless of the position of said first terminal relative to said second terminal, fuse controlled means for effecting disengagement of said contact and first terminal in response to fuse rupture within said fuse tube, and adjustable means for biasing said fuse tube for pivotal movement in either of two directions to a position wherein said contact is disposed between said two positions of said first terminal, thereby to provide for swinging movement of said contact away from said first terminal regardless of the position occupied by said first terminal.

5. Electrical protective apparatus, comprising a pair of spaced terminals insulated from each other and adapted to be supported in either of two different relative positions, an expulsion fuse tube assembly comprising a fuse tube having a pivot end and provided with a swing end contact latchingly engageable with one of said terminals, a pivot element pivotally supported by the other of said terminals, and means for detachably connecting the pivot end of said tube to said pivot element in either of two positions angularly displaced about the longitudinal axis of said fuse tube, whereby said contact may be positioned for latching engagement with said one terminal regardless of the relative positions of said terminals.

6. Electrical protective apparatus, comprising a pair of spaced terminals insulated from each other and adapted to be supported in either of two different relative positions, an expulsion fuse tube assembly comprising a fuse tube having a pivot end and provided with a swing end contact latchingly engageable with one of said terminals, a ferrule mounted upon said pivot end of said fuse tube and provided with radially extending locking lugs, a pivot element adapted for detachable pivotal support by the other of said terminals and provided with a socket for receiving the end of said ferrule, biasing means within said socket for biasing the head of a fuse link against said ferrule, and means within said socket cooperable with said lugs and said biasing means for detachably locking said ferrule in said socket in either of two positions angularly displaced about the longitudinal axis of said fuse tube, whereby said tube may be rotated about its longitudinal axis to position said contact for latching engagement with said one terminal regardless of the relative positions of said terminals.

7. Electrical protective apparatus, comprising a pair of spaced terminals insulated from each other and adapted to be supported in either of two different relative positions, an expulsion fuse tube assembly comprising a fuse tube having a pivot end and provided with a swing end contact latchingly engageable with one of said terminals, a pivot element pivotally supported by the other of said terminals and provided with a cam surface radially displaced from its axis of rotation and having different portions uniformly radiating in each direction from a low point, means for detachably connecting the pivot end of said tube to said pivot element in either of two positions angularly displaced about the longitudinal axis of said fuse tube, whereby said tube may be rotated about its longitudinal axis to position said contact for latching engagement with said one terminal regardless of the relative positions of said terminals, fuse controlled means for effecting disengagement of said contact and one terminal in response to fuse rupture within said tube, and biasing means adjustable about the axis of rotation of said pivot element for selective engagement with said different cam surface portions to pivot said tube in opposite directions to positions wherein said contact is disengaged from said one terminal regardless of the relative positions of said terminals, thereby to effect swinging movement of said contact away from said one terminal in response to disengagement therefrom.

8. Electrical protective apparatus, comprising a pair of spaced terminals insulated from each other and adapted to be supported in either of two different relative positions, an expulsion fuse tube assembly comprising a fuse tube having a pivot end and provided with a swing end contact latchingly engageable with one of said terminals, a ferrule mounted upon said pivot end of said fuse tube and provided with radially extending locking lugs, a pivot element adapted for detachable pivotal support by the other of said terminals and provided with a socket for receiving the end of said ferrule, said pivot element also being provided with a cam surface radially displaced from its axis of rotation and having different portions uniformly radiating in each direction from a low point, biasing means within said socket for biasing the head of a fuse link against the end of said ferrule, means within said socket cooperable with said lugs and said biasing means for detachably locking said ferrule in said socket in either of two positions angularly displaced about the longitudinal axis of said fuse tube, whereby said tube may be rotated about its longitudinal axis to position said contact for latching engagement with said one terminal regardless of the relative positions of said terminals, fuse controlled means for effecting disengagement of said contact and one terminal in response to fuse rupture within said tube, and biasing means adjustable about the axis of rotation of said pivot element for selective engagement with said different cam surface portions to pivot said tube in opposite directions to a position wherein said contact is disengaged from said one contact terminal regardless of the relative positions of said contact terminals, thereby to effect swinging movement of said contact away from said one terminal in response to disengagement.

9. Apparatus for protecting an electrical device disposed within a housing provided with a bushing projecting upwardly therefrom, comprising a lightning arrestor including an insulating housing, means for supporting said arrestor in either of two positions relative to the housing of said device, terminals respectively supported by said bushing and said insulating housing, an expulsion fuse tube assembly including a fuse tube having a pivot end and provided with a swing end contact latchingly engageable with one of said terminals, and means pivotally supporting said assembly at the pivot end thereof upon the other of said terminals in either of two positions angularly displaced about the longitudinal axis of said fuse tube, whereby said contact may be positioned for latching engagement with said one terminal contact regardless of the position in which said arrestor is supported relative to said housing.

10. Apparatus for protecting an electrical device disposed within a housing having a pair of supporting brackets spaced apart around the sides thereof and provided with a bushing projecting upwardly therefrom, comprising a lightning arrestor including an insulator, means for mounting said arrestor on either of said brackets, terminals respectively supported by said bushing and said insulator, a fuse tube assembly including a fuse tube having a pivot end and provided with a swing end contact latchingly engageable with one of said terminals, and means for pivotally supporting said tube at the pivot end thereof upon the other of said terminals in either of two positions angularly displaced about the longitudinal axis of said tube, thereby to position said contact for latching engagement with said one terminal regardless of the bracket upon which said arrestor is mounted.

11. In apparatus for protecting an electrical device, the means for pivotally supporting a fuse tube and for biasing the fuse tube for swinging movement from a closed circuit position to an open circuit position, which comprises a terminal, a pivot element adapted for detachable pivotal support by said terminal and provided with a cam surface radially displaced from its axis of rotation, biasing means engageable with said cam surface to swing said tube from its closed circuit position to its open circuit position, and interlocking means for detachably mounting a fuse tube upon said pivot element in either of two locked positions angularly displaced about the longitudinal axis of said fuse tube.

12. In apparatus for protecting an electrical device, the means for pivotally supporting a fuse tube and for biasing the fuse tube for swinging movement from either of two closed circuit positions to an open circuit position, which comprises a terminal, a pivot element adapted for detachable pivotal support by said terminal and provided with a cam surface radially displaced from its axis of rotation and having different portions uniformly radiating in each direction from a low point, biasing means selectively engageable with said different cam portions to pivot said tube respectively from said two closed circuit positions to open circuit positions, and means for detachably mounting said fuse tube upon said pivot element in either of two positions angularly displaced about the longitudinal axis of the fuse tube.

EDWARD H. YONKERS.

REFERENCES CITED

The following references are of record in the file of this patent:

UNITED STATES PATENTS

| Number | Name | Date |
| --- | --- | --- |
| 1,049,371 | Kovacs | Jan. 7, 1913 |
| 2,126,215 | Schultz | Aug. 9, 1938 |
| 2,126,216 | Schultz | Aug. 9, 1938 |
| 2,165,156 | Schultz | July 4, 1939 |
| 2,166,782 | Lemmon | July 18, 1939 |
| 2,163,398 | Hermann | June 20, 1939 |
| 2,269,610 | Thompson | Jan. 13, 1942 |
| 2,327,865 | Brown et al. | Aug. 24, 1943 |